United States Patent
Mitamura et al.

(10) Patent No.: US 6,784,648 B2
(45) Date of Patent: Aug. 31, 2004

(54) DC STABILIZED POWER SUPPLY

(75) Inventors: Atsushi Mitamura, Hanno (JP); Hideyuki Ono, Hanno (JP)

(73) Assignee: Shindengen Electric Manufacturing Co., Ltd., Tokyo (JP)

(*) Notice: Subject to any disclaimer, the term of this patent is extended or adjusted under 35 U.S.C. 154(b) by 0 days.

(21) Appl. No.: 10/657,071

(22) Filed: Sep. 9, 2003

(65) Prior Publication Data

US 2004/0046683 A1 Mar. 11, 2004

Related U.S. Application Data

(62) Division of application No. 10/090,774, filed on Mar. 6, 2002, now Pat. No. 6,653,960.

(30) Foreign Application Priority Data

Mar. 8, 2001 (JP) .................................. P2001-064550
Mar. 30, 2001 (JP) .................................. P2001-098640

(51) Int. Cl.[7] .............................................. G05F 1/40
(52) U.S. Cl. ..................................................... 323/282
(58) Field of Search ................................. 323/282, 283, 323/351; 341/143

(56) References Cited

U.S. PATENT DOCUMENTS

| | | |
|---|---|---|
| 5,055,708 A | 10/1991 | Sugawara |
| 5,677,618 A | 10/1997 | Fiez et al. |
| 5,977,896 A | 11/1999 | Kohdaka et al. |
| 6,392,580 B1 * | 5/2002 | Swanson .................. 341/155 |
| 6,448,745 B1 * | 9/2002 | Killat ........................ 323/222 |
| 6,472,933 B2 | 10/2002 | Hsu et al. |
| 6,507,301 B2 | 1/2003 | Locher |
| 6,586,991 B2 | 7/2003 | Masuda et al. |
| 6,653,960 B2 * | 11/2003 | Mitamura et al. ........ 341/143 |
| 2002/0185995 A1 | 12/2002 | Mitamura et al. |

FOREIGN PATENT DOCUMENTS

| | | | |
|---|---|---|---|
| EP | 1239575 | 11/2002 | |
| EP | 1265343 A2 * | 12/2002 | .......... H02M/3/156 |
| JP | 07-254823 | 10/1995 | |
| JP | 7-254823 | 10/1995 | |
| JP | 2000-307359 | 11/2000 | |

OTHER PUBLICATIONS

Klugbauer–Heilmeier et al., "A Sigma Delta Modulated Switching Power Amp", Journal of the Audio Engineering Society, Audio Engineering Society, New York, No. 3227, Mar. 24, 1992, pp. 1–18.

(List continued on next page.)

Primary Examiner—Adolf Berhane
(74) Attorney, Agent, or Firm—Nixon & Vanderhye P.C.

(57) ABSTRACT

A switching signal generator for a switching power supply employing a DC-DC modulator has an adder, an integrator and a quantizer. A gate driver circuit is provided upstream of a power switch element and receives a quantizer output. By feeding back a gate driver circuit output to the adder of the $\Delta\Sigma$-modulator, a large phase margin is obtained at a high-frequency switching. The switching signal generator for the $\Delta\Sigma$-modulation type switching power supply has an improved direct-current transmission linearity characteristic relative to direct-current input, and that is stably controllable and of high efficiency. Furthermore, a DC-DC converter has an adder, an integrator and a quantizer, the integrator having a mechanism for adjusting its gain. The gain-adjusting mechanism receives a signal from a current flowing internally of the DC-DC converter, a voltage internally of the converter, or a converter output voltage to control gain of the integrator so that the amplitude of output voltage of the integrator is not saturated and a comparator is capable of high-speed operation, a $\Delta\Sigma$-modulation type DC-DC converter is provided that is unlikely to undergo oscillation especially at a high sampling frequency, and that produces a stable output voltage.

4 Claims, 8 Drawing Sheets

OTHER PUBLICATIONS

Dunlap et al., "Design of a Delta–Sigma Modulated Switching Power Supply", Circuits and Systems, 1998, ISCAS '98, Proceedings of the 1998 IEEE International Symposium on Monterey, CA, May 31–Jun. 3, 1998, pp. 189–192.

Hirota et al., "A Novel Delta–Sigma Modulated DC—DC Power Converter Utilizing Dither Signal", PESC 2000, No. 2, Jun. 18–23, 2000, pp. 831–836, Galway, Ireland.

Andersen, "A New Application For Zero–Current–Switched Full–Wave Resonant Converters", Electronic Power Supply Systems, Brighton, Sep. 13–16, 1933, Proceedings of the European Conference on Power Electronics and Applications, London, IEE, GB, vol. 3, Conf. 5, Sep. 13, 1993, pp. 83–86.

* cited by examiner

DC STABILIZED POWER SUPPLY

This application is a divisional of application Ser. No. 10/090,774, filed on Mar. 6, 2002, now U.S. Pat. No. 6,653,960 the entire content of which is hereby incorporated in this application.

BACKGROUND OF THE INVENTION

1. Field of the Invention

The present invention relates to a DC stabilized power supply, and more particularly to a switching signal generator for use in a switching power supply employing a $\Delta \Sigma$-modulator, in which a switching signal for a power switch element is fed back from a gate driver circuit output to the modulator, and to a DC-DC converter utilizing $\Delta \Sigma$-modulation in which the gain of an integrator inside a $\Delta \Sigma$-modulator can be adjusted in accordance with output of the DC-DC converter.

2. Description of the Related Art

Description will first be made in connection with the switching signal generator for the switching power supply.

Figure 5:
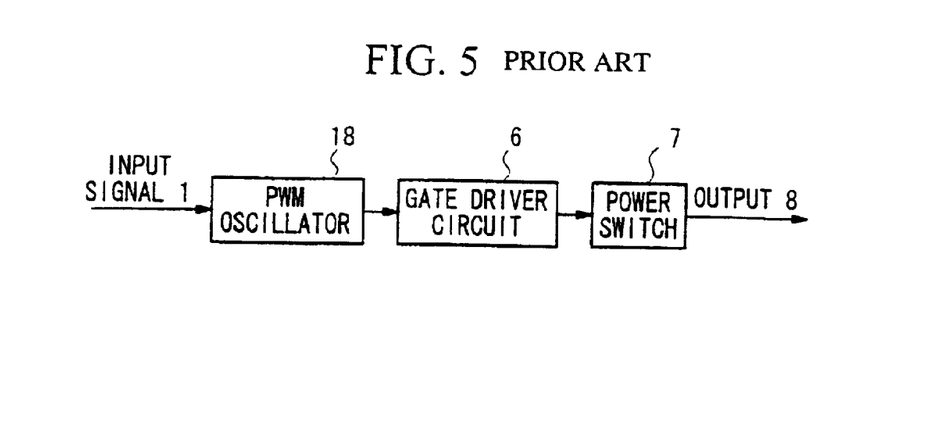
FIG. 5 is a block diagram of a conventional PWM switching signal generator.

A conventional PWM (pulse-width modulation) switching signal generator modulates an input signal by varying its pulse width. In other words, as shown in the block diagram of a PWM switching signal generator in FIG. 5, a PWM oscillator 18 generates a gate signal from an input signal 1, which gate signal is amplified by a gate driver circuit 6 to drive a power switch element 7. In the PWM system, the distortion produced at the gate driver circuit 6 has been unable to be corrected.

Figure 6:
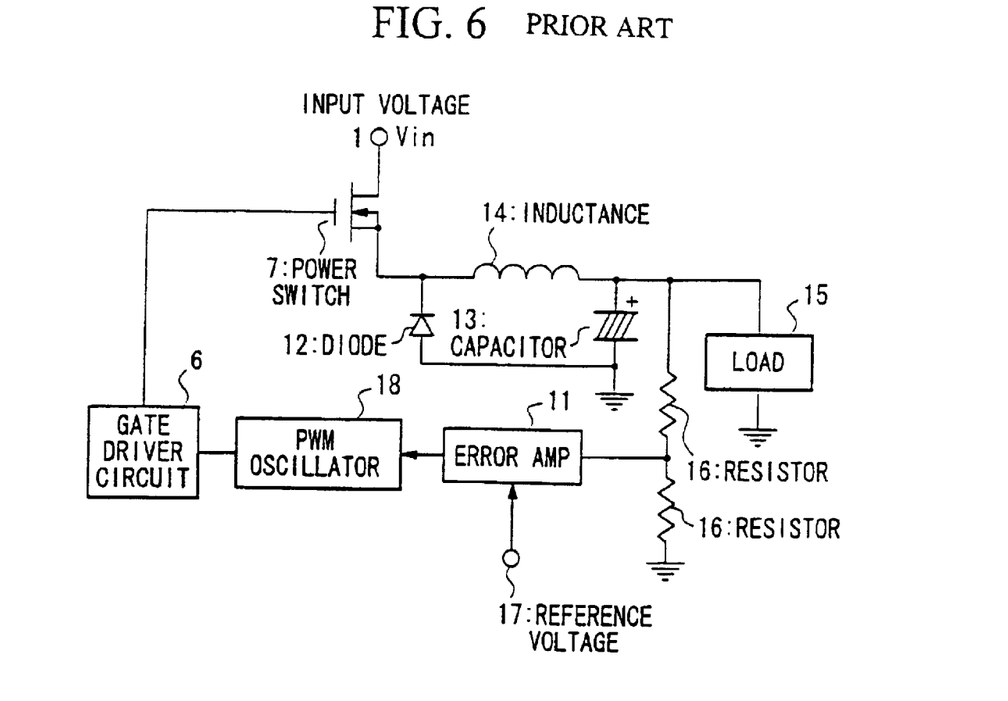
FIG. 6 is a block diagram of the conventional PWM switching signal generator applied to a step-down chopper power supply.

A block diagram of a conventional PWM switching signal generator applied to a step-down chopper is shown in FIG. 6. The voltage applied to a load and a reference voltage 17 are compared, and its result is inputted into a PWM oscillator 18 so that a power switch element 7 is controlled by the output of the PWM oscillator 18. In this generator, however, because there is provided no direct feedback path from the gate driver circuit 6, the distortion generated at the gate driver circuit 6 has been impossible to correct.

Figure 7:
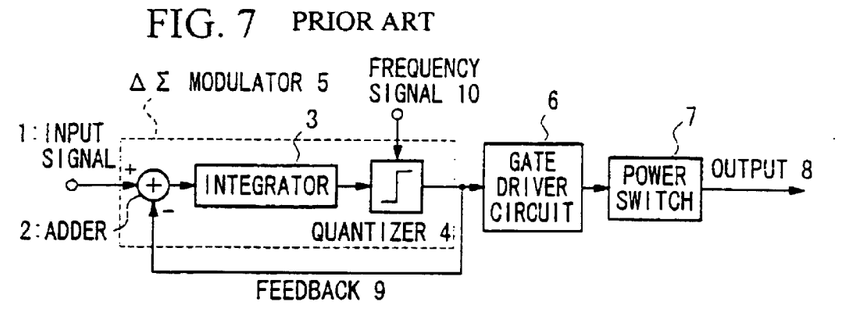
FIG. 7 is a block diagram of a conventional Δ Σ-switching signal generator.

Another conventional switching signal generator has been known in which, as shown in FIG. 7, a $\Delta \Sigma$-modulator 5 is used to output a gate drive signal to and drive a power switch element 7. In the $\Delta \Sigma$-modulator 5, an input signal is integrated by an integrator 3 instead of using the PWM oscillator and quantized to provide a one-bit output signal. With this generator, however, because the feedback is performed upstream of a gate driver, the distortion produced at the gate driver circuit 6 may not be corrected.

Figure 8:
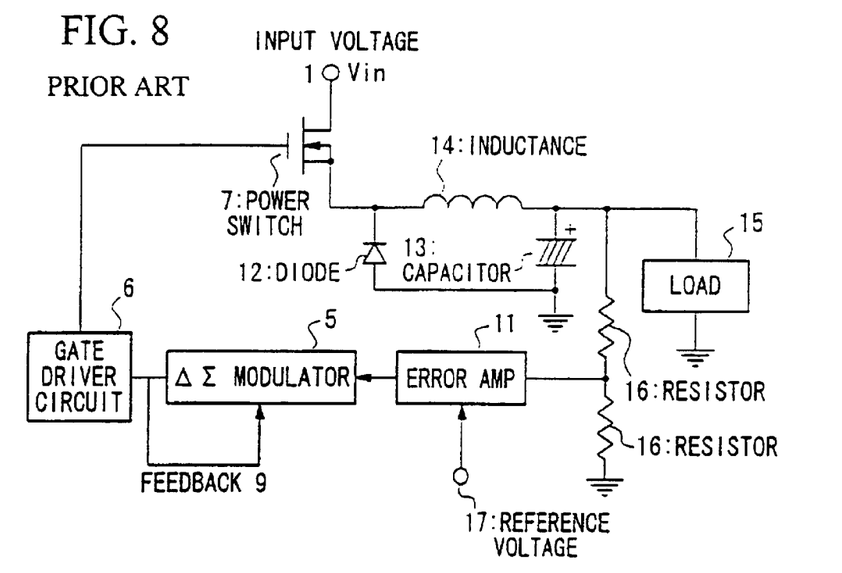
FIG. 8 is a block diagram of a conventional Δ Σ-switching signal generator applied to a step-down chopper power supply.

A block diagram of a conventional $\Delta \Sigma$ switching signal generator applied to a step-down chopper is shown in FIG. 8. The voltage applied to a load and a reference voltage 17 are compared, and its result is inputted into a $\Delta \Sigma$-modulator 5 so that a power switch element 7 is controlled by the output of the $\Delta \Sigma$-modulator 5. In this generator, however, because there is provided no direct feedback path from the gate driver circuit 6, the distortion generated at the gate driver circuit 6 has been impossible to correct.

As a result, because distortion has not been removed from the gate driver circuit 6 which directly drives the power switch element 7, the linearity of the $\Delta \Sigma$-modulator has been impaired.

Due to the distortion produced at the gate driver circuit both in the conventional PWM system and $\Delta \Sigma$ system, there is caused an error between, in the PWM system, the output signal of the PWM oscillator and the gate driver output signal and, in the $\Delta \Sigma$ system, between the output signal of the $\Delta \Sigma$-modulator and the gate driver output signal. Thus, when these conventional switching signal generators are used for controlling a switching power supply, especially when operated at a high frequency, there will be obtained only a small phase margin, resulting in unstable control.

Furthermore, the addition of a phase correction circuit, which is necessary to prevent oscillation, increases the number of parts and thus the cost. In addition, with these conventional generators, in order for an optimum circuit to be designed, an experiment with an actual circuit used has been conducted in many cases, resulting in stable circuit design being made difficult and increasing in development time.

Another method has been known in which the linearity is improved by inputting an analog signal and feeding back the output signal of a power switch element, as in a switching amplifier utilizing $\Delta \Sigma$ modulation proposed in Japanese Patent Application Laid-Open Specification No. 2000-307359.

Figure 9:
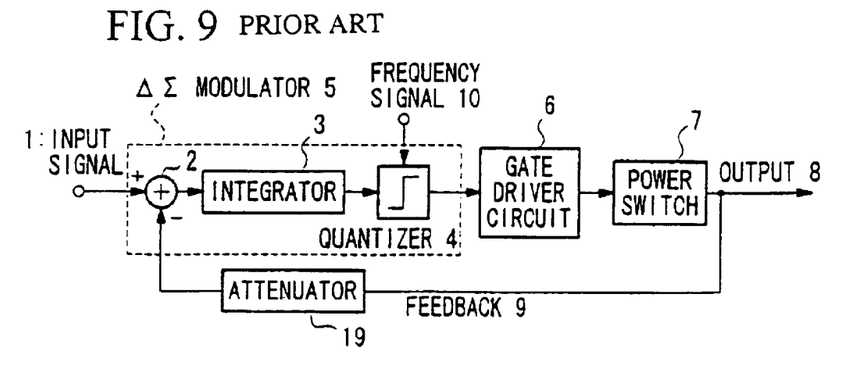
FIG. 9 is a block diagram of another conventional Δ Σ-switching signal generator.

FIG. 9 is a block diagram of a conventional $\Delta \Sigma$-modulation system in which the output signal of a power switch element is fed back. This conventional method, however, has the following drawbacks when used for controlling a switching power supply.

If the output current of a switching power supply is small, there will occur a discontinuity region in which the current flowing through an inductance located in a power supply circuit becomes discontinuous. If in this discontinuity region the current flowing through the inductance becomes zero, an oscillation is caused by a capacity component and an inductance component inside the power supply circuit.

As shown in FIG. 9, with the method of feeding back the output signal of a power switch element to a $\Delta \Sigma$-modulator, the noise caused by this oscillation is also fed back, thereby considerably increasing the number of switchings of the $\Delta \Sigma$-modulation output. Consequently, an increase is made in the switching loss, and a reduction is made in the power supply efficiency.

In other words, with a conventional switching signal generator, because the distortion produced at the gate driver is difficult to remove, an impaired linearity of direct-current transmission characteristics results, which in turn results in a small phase margin, thereby readily giving rise to oscillation.

With the conventional $\Delta \Sigma$-modulation-utilizing method in which the feedback path extends from downstream of the power switch element to improve the linearity, a reduction is made in the power supply efficiency due to the noise caused by the current discontinuity.

Description will now be made in connection with the DC-DC converter utilizing the $\Delta \Sigma$-modulation.

Figure 13:
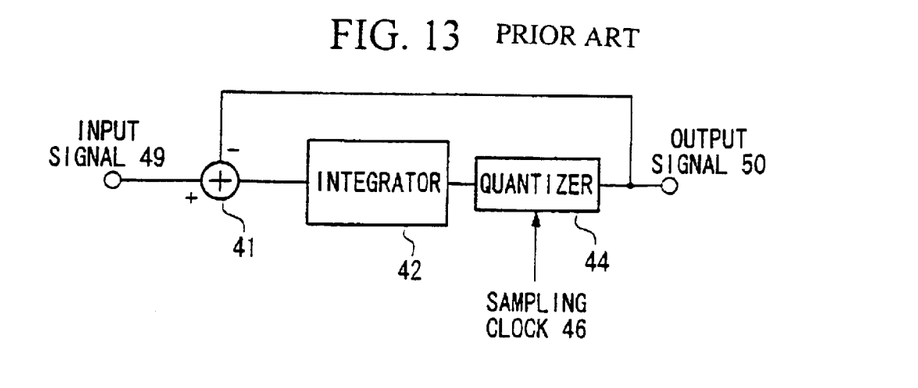
FIG. 13 is a block diagram of a conventional primary Δ Σ-modulator.

$\Delta \Sigma$-modulation is a modulation system in which an input signal is integrated, the integrated value is compared with a reference voltage to perform quantization, and its output is fed back to a modulator input. Shown in FIG. 13 is a block diagram of a primary $\Delta \Sigma$-modulator. By using this modulation system, switching of a switching element can be performed to make a DC-DC converter.

With a conventionally widely-used DC-DC converter employing a pulse width modulation system (PWM), the switching frequency is constant, whereas with a DC-DC converter utilizing $\Delta \Sigma$-modulation, the switching frequency varies responsive to a converter output. Thus, the latter has an advantage that a reduction may be made in the switching loss under light load, and has attracted attention.

Figure 14:
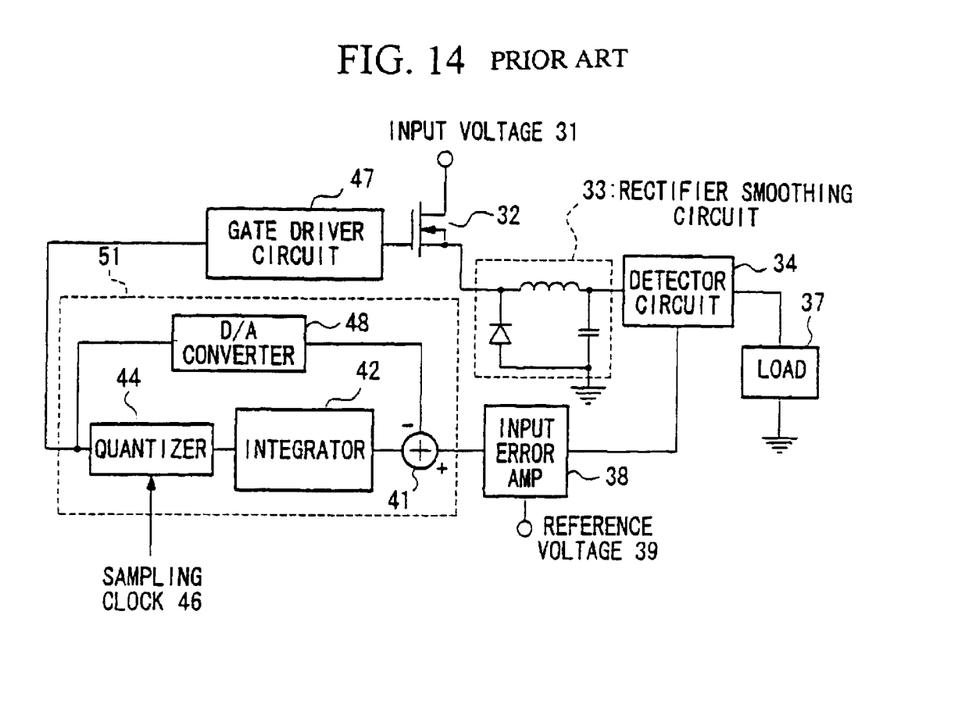
FIG. 14 is a block diagram of a conventional DC-DC converter.

Shown in FIG. 14 is one example of a conventional step-down chopper DC-DC converter utilizing Δ Σ-modulation in which, comparison is made between a converter output voltage and a reference voltage to Δ Σ-modulate an error-amplified signal voltage of the compared voltages as an input voltage of the Δ Σ-modulator, switching of a switching element is made by the output signal of the modulator, and the switching output is inputted into a smoothing circuit to obtain a constant voltage output.

Figure 15:
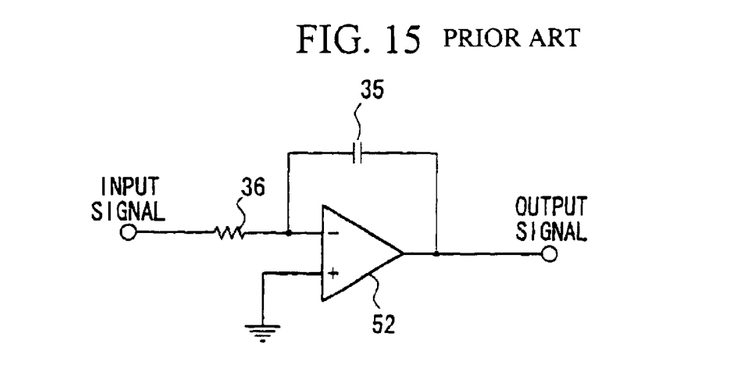
FIG. 15 is a block diagram of a conventional integrator.

The Δ Σ-modulator has at least one integrator, and shown in FIG. 15 is one example of an integrator employing an operational amplifier. The gain that represents the gradient of variation of the output voltage relative to the input voltage of the integrator, is determined, if the frequency component of the signal inputted into the integrator is within the operational amplifier band, only by the value of resistance and the capacitance value irrespective of the gain of the operational amplifier, and is proportional to the inverse of the product of the resistance value and the capacitance value.

Where Δ Σ-modulation is employed in a DC-DC converter, care must be taken so as not to saturate the output of an integrator located inside the Δ Σ-modulator, otherwise an accurate modulation will not be achieved, with the result that constant-voltage control of the DC-DC converter becomes unstable, making it impossible to maintain constant the output voltage of the DC-DC converter.

Due to the above, the gain of an integrator has conventionally been determined so as not to saturate the integrator output. In other words, the amplitude of an integrator generally becomes great when the output current of a DC-DC converter is small, and hence, in order for the integrator not to become saturated at that time, it has been necessary to set the gain low.

With the above conventional method, the amplitude of the integrator becomes small when the output current of the DC-DC converter is great. Because the gain is set low so that the integrator output will not become saturated when the output current is small, there has arisen a problem that the amplitude of the integrator output is of small value less than the order of mV.

The quantizer of a Δ Σ-modulator requires a comparator for comparing the integrator output with a reference voltage. The difference between the two voltages that are compared at the comparator is called an overdrive. If the overdrive is large, the variation of the output voltage of the comparator becomes rapid, making a high-speed operation possible, whereas in contrast, if the overdrive is small in amount, a high-speed operation cannot be realized.

The minimum overdrive amount generally required for a comparator to operate at a high speed is from several tens of mV to 100 mV In order to increase the overdrive amount and enable the comparator to operate at a high speed, it has been necessary to increase the gain of the integrator.

In the conventional method, however, because, for the purpose of preventing saturation of the integrator output, the gain of the integrator is fixed low in conformity with the time when the amplitude of the output voltage of the integrator is greatest, the comparator may not be given a sufficient overdrive when the output current of the DC-DC converter is great, and thus the amplitude of the output voltage of the integrator is small, making it impossible for the comparator to operate at a high speed.

The low-speed operation of the comparator causes the feedback of the DC-DC converter to be at a low speed, and there has been a problem that, if switching, especially high-frequency switching of the DC-DC converter is made, it gives rise to oscillation.

In other words, with the conventional method, there has been a trade-off in that, if the gain of the integrator is fixed low so as not to saturate the integrator output, the DC-DC converter undergoes oscillation, and if the gain of the integrator is fixed high so as not to cause oscillation of the DC-DC converter, the integrator output becomes saturated and the output voltage becomes unstable.

Thus, with the conventional method, due to this trade-off, the gain of the integrator must be made low to such a degree as not to saturate the integrator output, and must be made high to such a degree as not to cause oscillation of the converter, resulting in designing difficulty and, in addition, in difficulty in realizing a fast-operating converter without causing saturation of the integrator.

SUMMARY OF THE INVENTION

The present invention has been made to overcome the above drawbacks, and accordingly, it is an object of the present invention to provide a switching signal generator for use in a switching power supply employing a Δ Σ modulator, which is of high efficiency, provides a large phase margin, and is stably controllable during switching at a high frequency.

It is another object of the present invention to provide a DC-DC converter employing Δ Σ-modulator, which is stably controllable during switching at a high frequency and produces a stable output voltage without undergoing oscillation even at a high sampling frequency.

In order to attain the above objects, the present invention according to one aspect thereof is characterized in that, in a switching power supply in which an analog input signal or a multi-bit digital signal is inputted into a Δ Σ-modulator, and the modulated signal is amplified at a gate driver circuit to perform switching of a power switch element with the thus amplified signal, the gate driver output is fed back to the Δ Σ-modulator.

The Δ Σ-modulator is constituted by at least one adder, one integrator, and one quantizer. The feedback path extends from the output of the gate driver circuit connected to a quantizer output to at least one adder input. The at least one integrator is connected to an adder output and has at least one output connected to the quantizer.

By providing two or more integrators in series connected to the adder output, or by providing two or more integrators in parallel connected to the adder output, the accuracy of sampling will be enhanced by the former, and a parallel arrangement of outputs will be obtained, making it possible to provide a precision or multi-output switching power supply for a small-sized integrated circuit.

Where a continuous-time signal such as an analog signal is inputted into the Δ Σ-modulator, an analog adder and an analog integrator are used as the adder at the input of the modulator and the integrator connected to the adder output, respectively, and where a discrete-time signal such as a multi-bit digital signal is inputted into the modulator, a digital adder and a digital integrator may be used.

The quantizer is a quantizer that performs sampling on the discrete-time signal and is connected to the input of the gate driver circuit that receives an output signal of the quantizer and supplies the current/voltage sufficient to drive the power switch element. Such a gate driver circuit is needed in case the quantizer output is insufficient to drive the power switch element and is needed for the fed-back signal to fully show its effect.

The feedback path may include an attenuator that adapts a pulse signal of great amplitude of the gate driver circuit to the level of the input signal of the Δ Σ-modulator.

Because the feedback path is provided that extends from the output of the gate driver connected to a quantizer output to a modulator input, a reduction is made in the distortion produced at the gate driver. In other words, as compared with the conventional PWM system and the conventional Δ Σ-modulator in which feedback is made from immediate downstream of the quantizer, the distortion produced at the gate driver may be directly fed back.

Because direct feedback is made from the output of the gate driver circuit connected to the quantizer output to the modulator input, a satisfactory linearity of input and output characteristics may be obtained, leading to a large phase margin and unlikeliness of oscillation.

By direct feedback from the gate driver output, the distortion produced at the gate driver circuit may be directly fed back, and as compared with the case where the feedback is made from downstream of the power switch element, less noise is produced, and when the switching signal generator is applied in a switching power supply, a reduction can be made in the switching loss.

It is apparent that by making the analog input signal direct-current voltage, the output is amplified into a direct-current power, making it possible for the switching power supply to function as direct-current switching power supply. It is also possible to make up a Δ Σ-modulation type chopper power supply by adding a rectifier smoothing circuit downstream of the power switch element.

The present invention according to another aspect thereof is characterized in that, in a DC-DC converter in which an analog input signal or a multi-bit digital signal is inputted into a Δ Σ-modulator to perform switching of a switching element with the thus modulated signal, the gain of an integrator inside the Δ Σ-modulator is adjusted in accordance with conditions of the converter.

The Δ Σ-modulator is constituted by at least one adder, one integrator and one quantizer, a feedback path is provided to extend from the Δ Σ-modulator output to at least one adder input, and the at least one integrator is connected to an adder output and has at least one output connected to the quantizer.

The quantizer performs sampling on a discrete-time signal and is connected to the input of a gate driver circuit. The gate driver circuit receives an output signal of the quantizer and supplies the current/voltage sufficient to drive the power switch element.

The at least one integrator is provided with a gain-adjusting circuit. In other words, a current flowing inside the DC-DC converter, voltage inside the converter, or converter output voltage is detected, and by controlling either one or both of the resistance value and the capacitance value as indicated, for example, in FIG. 15 by the detected signal, the gain of the integrator may be adjusted.

Furthermore, it is possible to directly detect the output voltage of the integrator and, in accordance with the detected signal, adjust the gain of the integrator within the range in which the gain of the integrator is so low as not to saturate the amplitude of the output voltage of the integrator and is so high as to allow high-speed operation of the comparator.

Because the gain of the integrator may be adjusted within the range in which the output voltage amplitude is not saturated while the comparator can operate rapidly, by enhancing the gain at the time when the integrator amplitude is small, the overdrive given to the comparator may be increased, and thus a high-speed feedback and a stable constant voltage control of the converter may be realized.

In contrast, by reducing the gain at the time when the integrator amplitude is great, saturation of the integrator output may be prevented, leading to a stable constant voltage control.

Furthermore, if a variation is made in the gain of the integrator, such a variation is corrected by the feedback from the Δ Σ-modulator output, and thus the input and output linearity of the modulator will not be impaired, and the operation of the modulator will be maintained stable.

In other words, according to the another aspect of the present invention, a stable DC-DC converter is provided in which, relative to the operating condition of the DC-DC converter, the gain of the integrator may be adjusted within the range in which the amplitude of the output voltage is not saturated and the comparator can operate at a high speed, and which does not undergo oscillation and suffers from few fluctuations in the output voltage.

The above and other objects and features of the present invention will become more apparent from the following description taken in conjunction with the accompanying drawings.

DETAILED DESCRIPTION OF THE PREFERRED EMBODIMENTS

Preferred embodiments of the present invention will now be described with reference to the accompanying drawings, in which like parts or components are given like reference numerals and duplicated descriptions thereof will be omitted.

Figure 1:
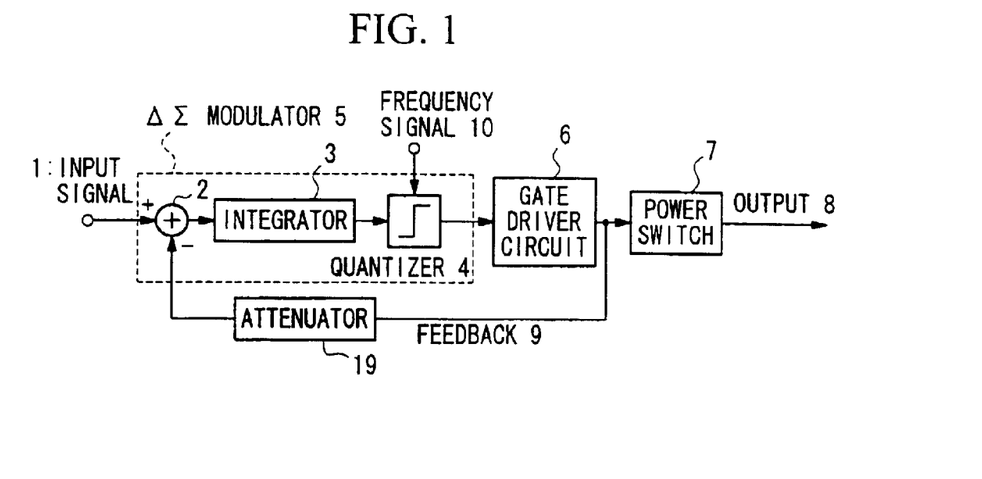
FIG. 1 is a block diagram of a switching signal generator according to one embodiment of the present invention.

FIG. 1 is a circuit diagram of one embodiment of the present invention. In this circuit diagram, an input signal 1 is inputted into an adder 2, the output of which is inputted through an integrator 3 into a quantizer 4. The output of the quantizer 4 is inputted into a gate driver circuit 6, and the output of the gate driver circuit 6 is supplied to a power switch element 7. There is provided a path by which the output of the gate driver circuit 6 is fed back through an attenuator 19 to the adder 2.

Figure 2:
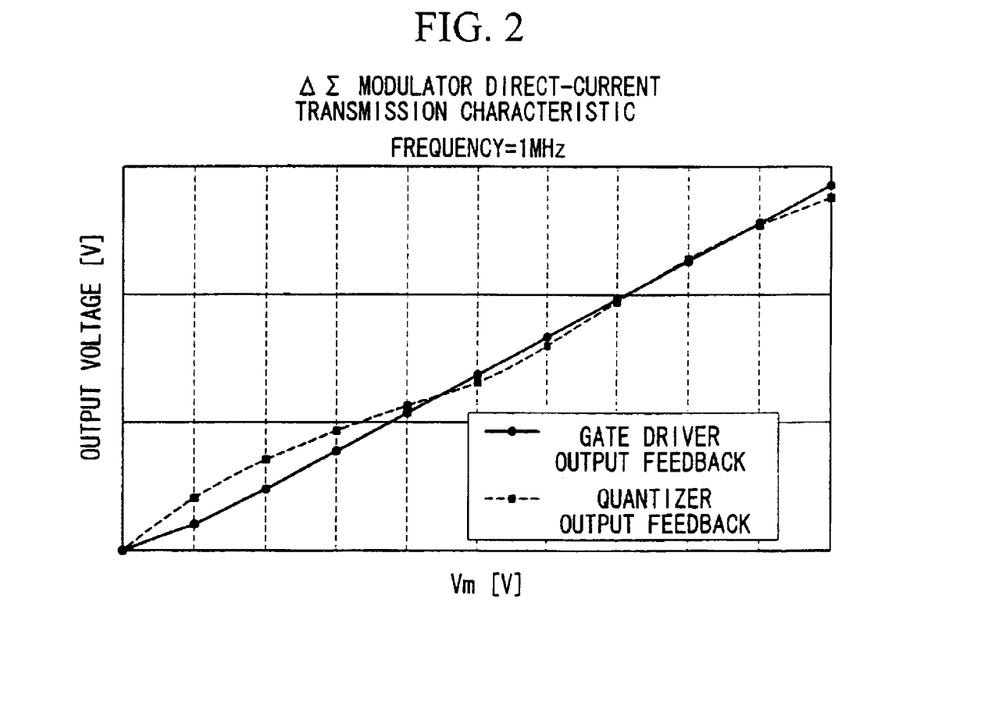
FIG. 2 is a direct-current transmission characteristic chart showing a comparison between feedback of a gate driver circuit output according to the present invention and feedback of a quantizer output according to a conventional method.

As compared with the conventional method in which the output of the quantizer 4 is fed back to the adder 4, by directly feeding back as in the present invention the output of the gate driver circuit 6 having undergone at the gate driver circuit 6 either one or both of voltage amplification and current amplification sufficient to drive the power switch element 7, a great distortion reduction is made, leading to an improved linearity of the direct-current transmission characteristic. Shown in FIG. 2 is the direct-current transmission characteristic as referred to above.

Figure 3:
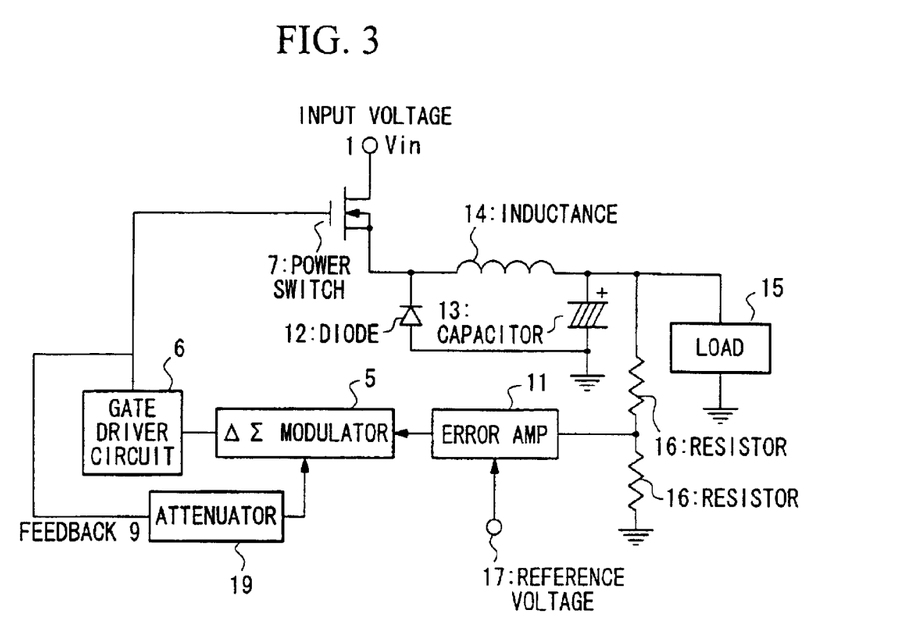
FIG. 3 is a block diagram of Δ Σ switching signal generator of the present invention applied to a step-down chopper.

FIG. 3 shows an example in which the present invention is applied to a step-down chopper of a $\Delta\Sigma$ modulation type. The voltage applied to a load and a reference voltage 17 are compared to amplify a differential voltage, and a signal obtained by modulating the differential voltage at a $\Delta\Sigma$ modulator 5 is outputted into the gate driver circuit 6 so that a power switch element 7 is driven with a gate drive signal. A structure is provided for feeding back to the $\Delta\Sigma$ modulator 5.

If for example direct-current voltage is inputted by way of power input by an analog signal, a power-amplified direct-current voltage may be obtained as the output of the power switch element 7. In other words, it is possible for the switching power supply to be driven in accordance with the output voltage. The signal after modulation is made binary, and thus construction of an integrated circuit is easy and a small-sized switching power supply may be provided.

Figure 4:
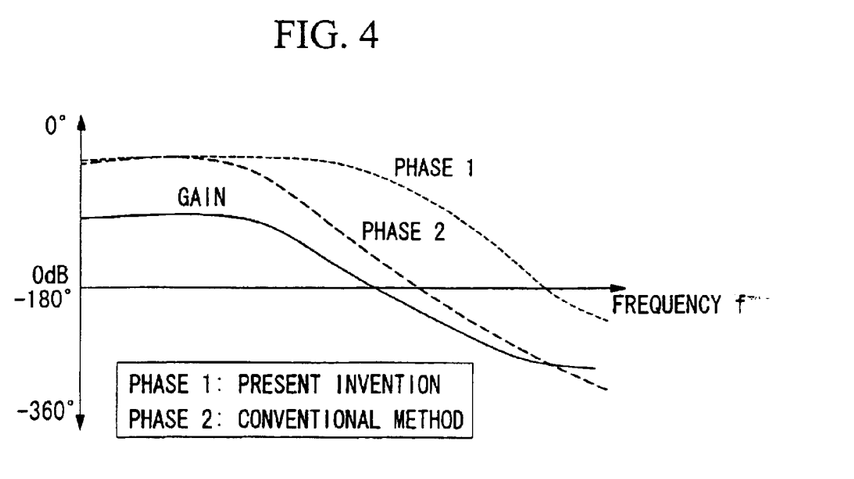
FIG. 4 is a Bode diagram showing a gain and phases according to the present invention and the conventional method.

Thus, by feeding back the output of the gate driver circuit 6 to the $\Delta\Sigma$ modulator which output has a current/voltage capacity sufficient to drive the power switch element 7, a great effect is exerted on the input signal and the distortion produced at the gate driver circuit 6 may be reduced, and as shown in FIG. 4, a large phase margin is obtained even at a high-frequency switching of the power switch element 7, leading to a stable control.

Although FIG. 3 and its corresponding description above especially concerns a step-down chopper, it is apparent that the present invention is also applicable to a step-up chopper and a polarity reversal chopper.

Figure 10:
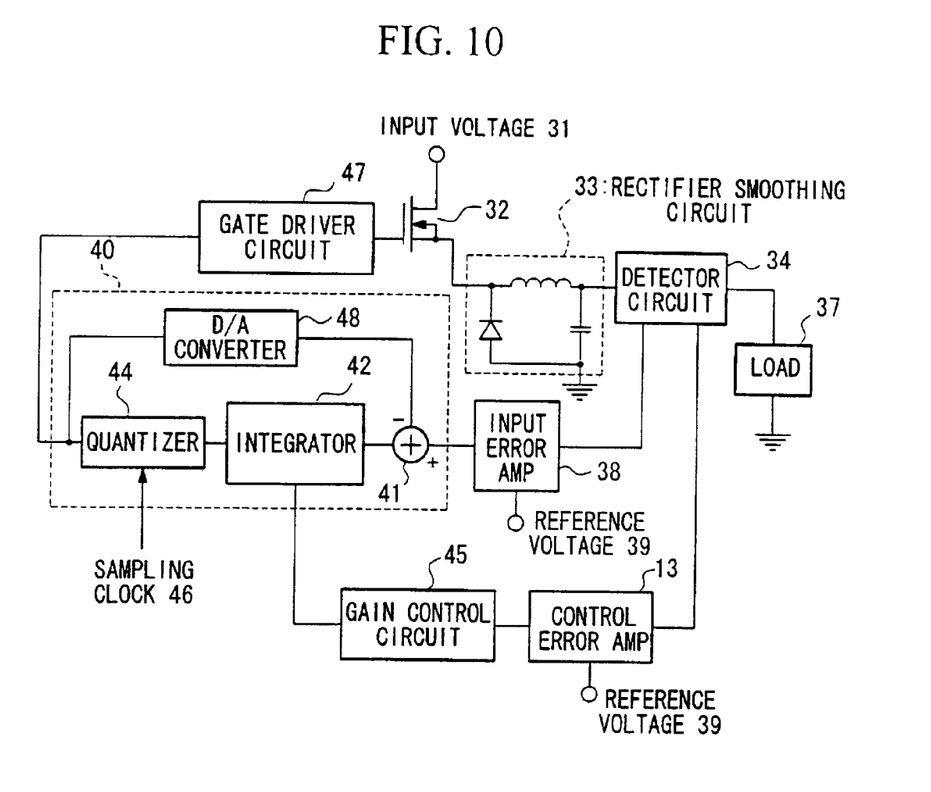
FIG. 10 is a block diagram of a step-down chopper DC-DC converter according to one embodiment of the present invention.

Reference is now made to FIG. 10, which is a block diagram of a step-down chopper DC-DC converter utilizing $\Delta\Sigma$-modulation according to one embodiment of the present invention. An output voltage of a detector circuit 34 is compared with a reference voltage 39, and an output voltage of an input error amplifier 38 resulting from the above comparison is inputted into an adder 41 of a $\Delta\Sigma$-modulator 40 and subjected to $\Delta\Sigma$-modulation. An output signal of the $\Delta\Sigma$-modulator 40 is passed to a gate driver circuit 47 to make switching of a switching element 32, and the switching output is inputted into a rectifier smoothing circuit 33 to provide a constant voltage output.

The output of the $\Delta\Sigma$-modulator 40 is fed back through a D/A converter 48 to the adder 41, and the integrator 42 is provided with a gain control circuit 45 for adjusting its gain. The detector circuit 34 detects DC-DC converter output, the detected signal is amplified at a control error amplifier 43, and the amplified signal is inputted into the gain control circuit 45 so that the gain of the integrator 42 is adjusted at the gain control circuit 45 in accordance with the signal.

Figure 11:
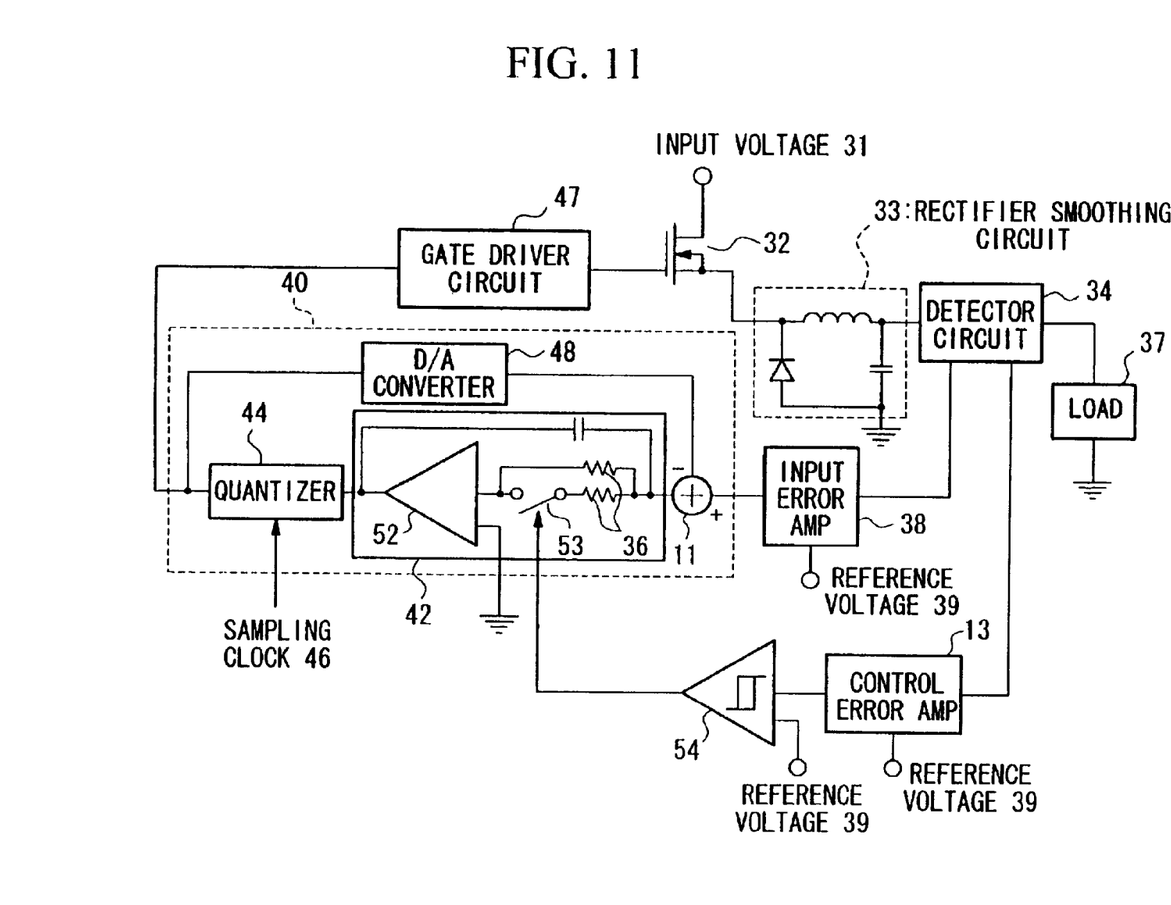
FIG. 11 is a block diagram of a specific example of a DC-DC converter according to the present invention.

Referring to FIG. 11, which shows a concrete example of the present invention, an output voltage of the detector circuit 34 is compared with a reference voltage 39, and an output signal of the control error amplifier 43 is inputted into a comparator 54. The comparator 54 supplies a control signal to a switch element 53 located inside an integrator 42 including an operational amplifier 52 so that the switch element 53 is turned off when the converter output current is great and the switch element 53 is turned on when the converter output current is small.

Due to the above, the gain of the integrator 42 may be adjusted within the range in which the gain is so low as not to saturate the amplitude of the output voltage of the integrator 42, but so high as to allow high-speed operation of the comparator 54.

Figure 12:
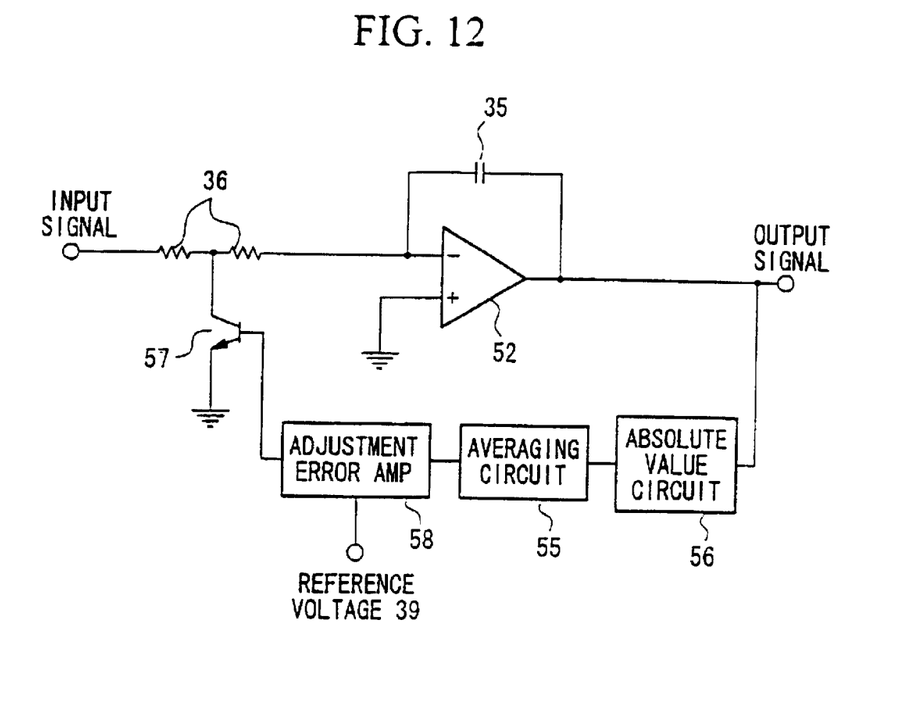
FIG. 12 is a block diagram of one example of an integrator located inside a converter according to the present invention, which integrator is provided with a detector circuit.

FIG. 12 is a block diagram of an integrator 42 portion inside a $\Delta\Sigma$-modulator 40 according to the present invention, and shows an example for detecting and controlling output inside the integrator. The output of the integrator 42 is rectified at an absolute value circuit 56, the rectified signal is averaged at an averaging circuit 55, and the averaged signal is compared with a reference voltage 39 at an adjustment error amplifier 58 to amplify the compared signal.

By controlling a transistor 57 at the input of the integrator 42 with the signal amplified at the adjustment error amplifier 58, resistors 36 of the integrator 42 may be adjusted, with the result that the gain of the integrator is adjusted so that the output voltage amplitude of the integrator will become constant.

As described hereinbefore, according to the present invention, in the switching power supply employing a $\Delta\Sigma$-modulator, by feeding back the output of a gate driver circuit to the $\Delta\Sigma$-modulator, distortion at the gate driver circuit may be reduced to drive the power switch element, leading to a large phase margin and a stable control, especially at a high switching frequency, without causing oscillation. In other words, a switching power supply may be provided that is unlikely to give rise to oscillation even at a high switching frequency, and that supplies an output voltage corresponding to an input voltage.

Furthermore, according to the present invention, in the DC-DC converter employing a $\Delta\Sigma$-modulator, by adjusting the gain of an integrator within the range in which the amplitude of the output voltage of the integrator is not saturated and the comparator is capable of high-speed operation, the integrator output voltage amplitude is optimized, so that a DC-DC converter is provided that does not give rise to oscillation and gives a stable constant voltage output especially at a high sampling frequency.

What is claimed is:

1. A DC-DC converter comprising:
   a M-modulator for $\Delta\Sigma$-modulating an analog signal such that switching of a switching element is made in response to the modulated signal;
   at least one integrated constituting said $\Delta\Sigma$-modulator and provided with a gain-adjusting means; and
   a detector circuit for detecting a current flowing internally of said DC-DC converter, a voltage internally of said DC-DC converter, or a converter output voltage,
   wherein said gain-adjusting means adjusts gain of said integrator based on a signal from said detector circuit such that output of said integrator becomes a desired voltage.

2. A DC-DC converter according to claim 1, wherein said detector circuit detects an output voltage of said at least one integrator provided with said gain-adjusting means and outputs a signal for adjusting the gain of said at least one integrator provided with said gain-adjusting means.

3. A DC-DC converter according to claim 1, wherein said gain-adjusting means comprises a comparator that supplies a control signal to a switch element for said integrator such that said switch element is turned off if a converter output current is great and is turned on if the converter output current is small.

4. A DC-DC converter according to claim 1, wherein said gain-adjusting means comprises an absolute value circuit for rectifying output of said integrator, an averaging circuit for averaging the rectified signal, an adjustment error amplifier for comparing the averaged signal with a reference voltage and amplifying the differential signal, and a transistor located at an input of said integrator, which is controlled by the signal amplified at said adjustment error amplifier.

* * * * *